United States Patent [19]

Okuno et al.

[11] Patent Number: 5,481,672
[45] Date of Patent: Jan. 2, 1996

[54] DETECTING REWRITING OF STORED DATA, USING CODES BASED ON PASSWORD AND THE STORED DATA

[75] Inventors: Yasuhiro Okuno, Kawasaki; Tadashi Yamakawa, Yokohama; Masaaki Nagashima, Kawasaki; Takayuki Sasaki, Yokohama, all of Japan

[73] Assignee: Canon Kabushiki Kaisha, Tokyo, Japan

[21] Appl. No.: 842,514

[22] Filed: Feb. 27, 1992

[30] Foreign Application Priority Data

Feb. 27, 1991 [JP] Japan .................................. 3-032896
Feb. 27, 1991 [JP] Japan .................................. 3-032911
Feb. 27, 1991 [JP] Japan .................................. 3-032912
Feb. 27, 1991 [JP] Japan .................................. 3-032913

[51] Int. Cl.$^6$ .................................................. G06F 11/00
[52] U.S. Cl. ............................. 395/188.01; 395/186
[58] Field of Search ........................ 371/71, 67.1, 68.3; 395/575, 186, 187.01, 188.01; 364/927.2; 380/23, 4, 25

[56] References Cited

U.S. PATENT DOCUMENTS

| | | | |
|---|---|---|---|
| 3,920,976 | 11/1975 | Christensen et al. | 235/153 AM |
| 5,018,096 | 5/1991 | Aoyama | 364/900 |
| 5,144,659 | 9/1992 | Jones | 380/4 |
| 5,202,982 | 4/1993 | Gramlich et al. | 395/600 |
| 5,224,067 | 6/1993 | Harada | 364/927.2 |
| 5,237,678 | 8/1993 | Kuechler et al. | 395/600 |
| 5,239,294 | 8/1993 | Flanders et al. | 340/825.34 |

OTHER PUBLICATIONS

Lewis et al., "Shared Books: Collaborative Publication Management for an Office Information System", 1988 Conf. on Office Info. Systems, pp. 197–204.

Almes et al., "The Eden System: A Technical Review", IEEE Transactions on Software Eng., vol. SE–11, (Jan. 1985), pp. 43–59.

Primary Examiner—Hoa T. Nguyen
Attorney, Agent, or Firm—Fitzpatrick, Cella, Harper & Scinto

[57] ABSTRACT

In storing data, a first code is generated by converting a password and some predetermined portion of the data itself (e.g., all of the data itself, or a time stamp) in a predetermined procedure. The first code is then stored in correspondence to the data. Thereafter, in reading the stored data, a second code is generated by converting the password and the same predetermined portion of the stored data, using the same predetermined procedure, and the resulting second code is compared with the first code stored in correspondence to the stored data. A determination is made that a rewrite has occurred, if the two codes do not match. Subsequent data processing may be controlled in accordance with the result of this determination.

27 Claims, 18 Drawing Sheets

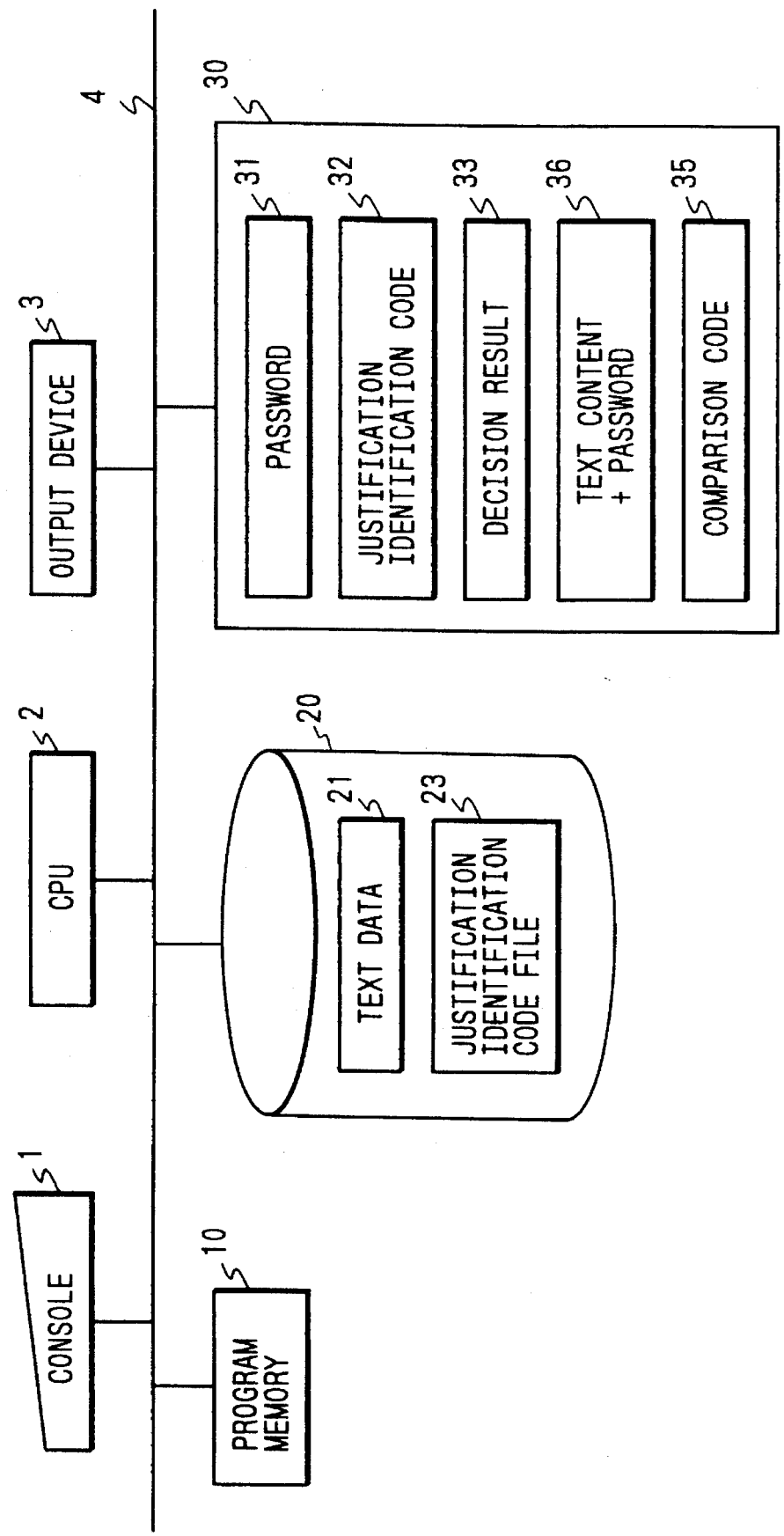

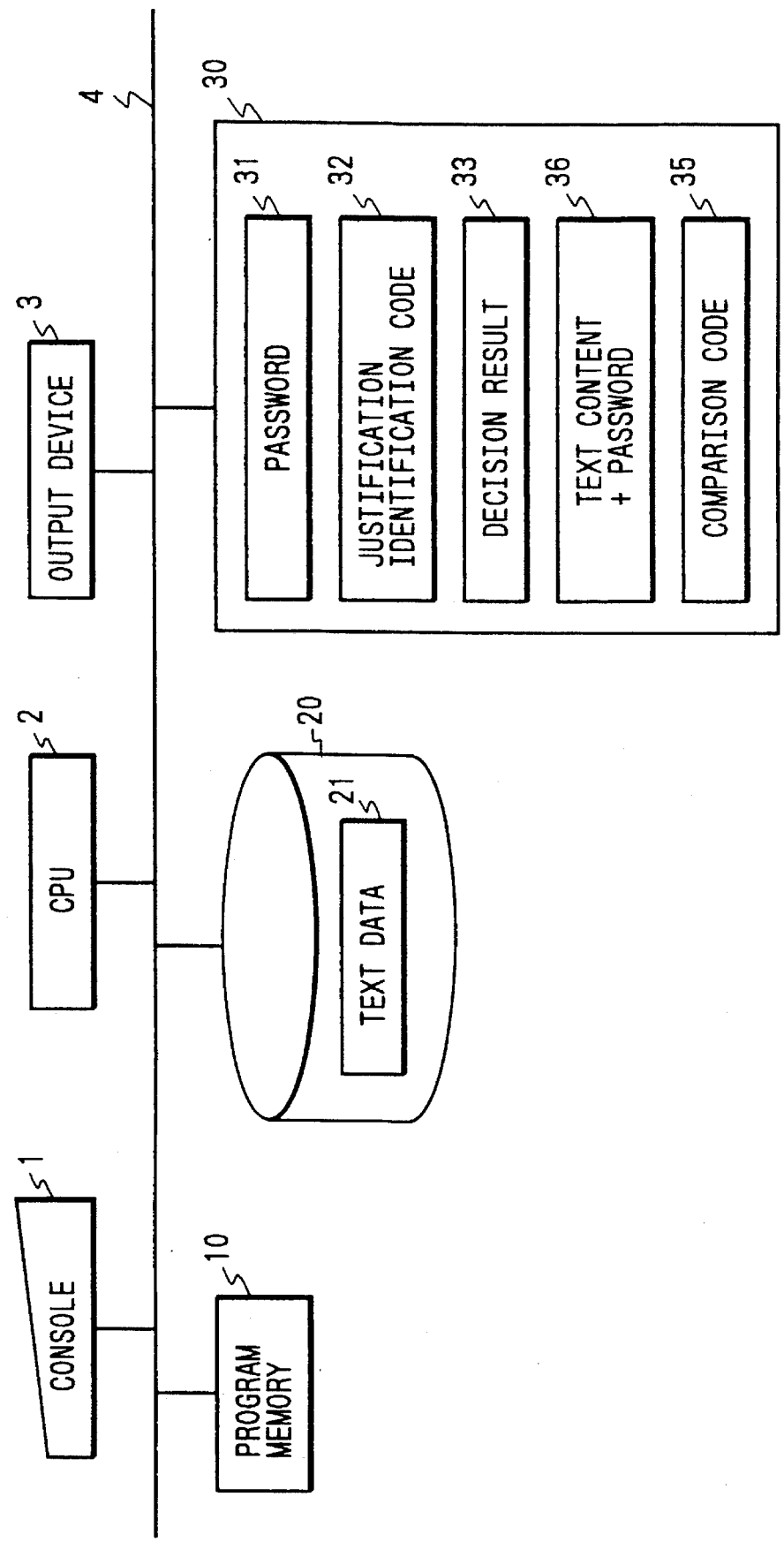

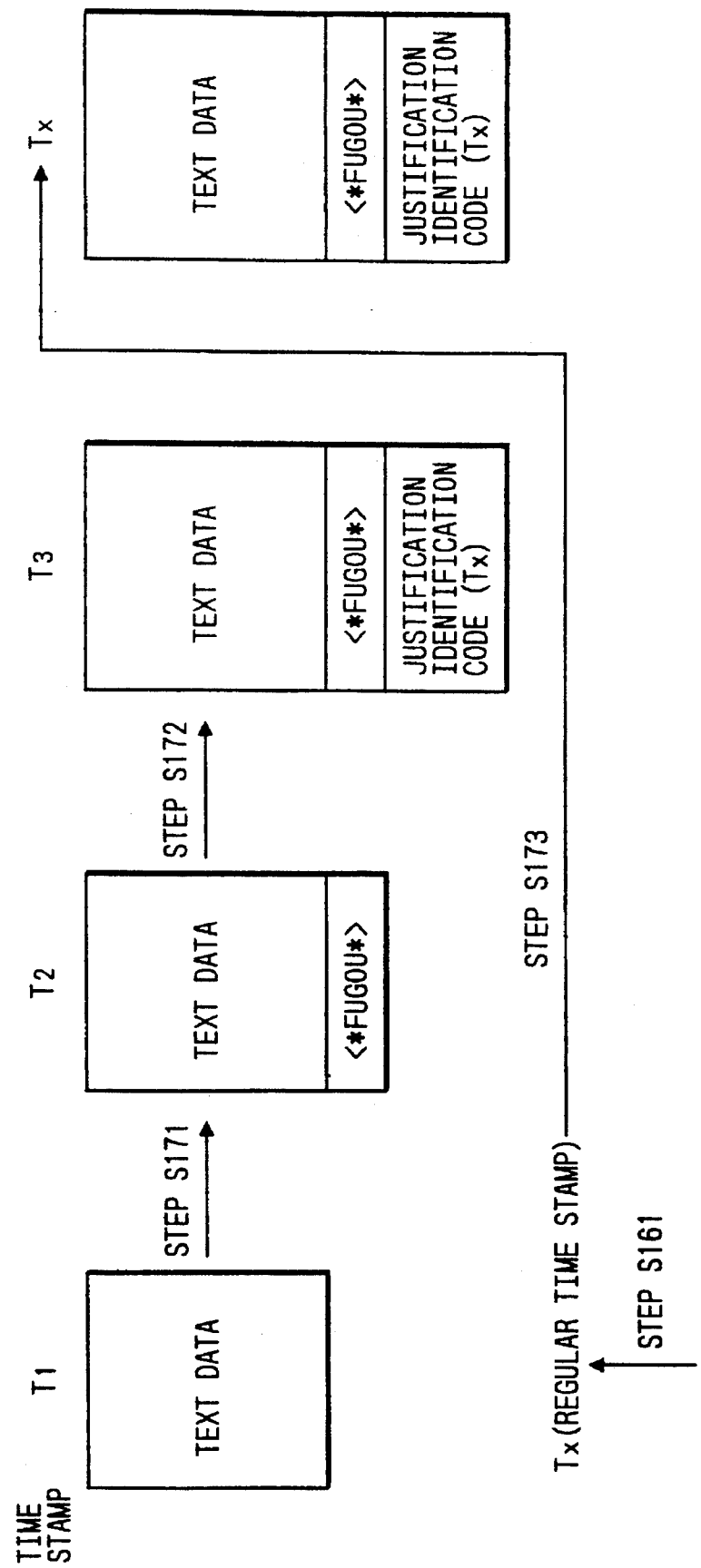

DETECTING REWRITING OF STORED DATA, USING CODES BASED ON PASSWORD AND THE STORED DATA

BACKGROUND OF THE INVENTION

1. Field of the Invention

The present invention relates to a method in a data processing system for creating, registering and managing the document or program, wherein the method includes determining whether or not the content of stored data is a valid data which remains as created and stored by the authorized user, and if improper rewrite is made, detecting the face that the rewrite has been made.

2. Related Background Art

It is conventionally common practice that a document is created on a computer, and stored as a file.

When this document file is used in the joint work by a plurality of users, a method has been adopted in which under the operating system, the file is shared among the plurality of users and other users are inhibited from the access to the file.

For example, in a UNIX operating system, the permission for the write, the reference (read), and the execution into each file can be given to the owner of the file, the group of joint work, and other users.

In such a system, when a certain file is shared within the group, and the users out of the group is inhibited from changing the file, a method is taken in which the users within the group are permitted to write the file, but the users out of the group are inhibited from writing, so that the file can be shared only within the group.

However, with the conventional example, the permission for writing or reading a certain file is only given the owner of file, the group and other users. Also, the justification of the document is assured by inhibiting the unauthorized user from writing or reading. Accordingly, there were following problems.

1. It is not possible to meet a requirement of recognizing the rewrite if any, although the rewrite by others is permitted.
2. When the group for dealing with each file is different, a number of groups are created, in which the members of each group are registered, and the group corresponding to each file belongs must be registered, so that the management becomes very complicated.
3. When the rewrite by the super user (user having all rights for any file) or the false rewrite by the authorized user is made, there is no indication for the alteration.

SUMMARY OF THE INVENTION

An object of the present invention is to provide a method for determining whether or not the content of stored data is a valid data which remains as created and stored by the authorized user, and detecting the fact that the improper rewrite, if any, has been made.

Another object of the present invention is to provide a data processing method for determining whether or not the improper rewrite of processed data has been made, and inhibiting the execution of the processing if the improper rewrite is made.

Another object of the present invention is to make the operation simpler when repeating the above-mentioned determination for a plurality of data.

Another object of the present invention is to store the determination information for the above-mentioned determination and make the management simpler.

According to one aspect, the present invention which achieves these objectives relates to a method for determining whether or not the improper rewrite of stored data has been made, comprising steps of in storing the data, inputting a password, generating a first code by converting the input password and the stored data in a predetermined procedure, storing the first code in correspondence to the stored data, and in reading the stored data, inputting the password, generating a second code by converting the input password and the stored data in the predetermined procedure, comparing the generated second code and the first code stored in correspondence to the stored data, and determining that the improper rewrite has been made if the comparison result is unmatched.

According to another aspect, the present invention which achieves these objectives relates to a method for determining whether or not the improper rewrite of stored data has been made, comprising steps of in storing the data, storing the data with a storing time appended, inputting a password, extracting the storing time from the stored data, generating a first code by converting the input password and the extracted storing time in a predetermined procedure, storing the first code in correspondence to the stored data, and in reading the stored data, inputting the password extracting the storing time from the stored data, generating a second code by converting the input password and the extracted storing time in the predetermined procedure, comparing the generated second code and the first code stored in correspondence to the stored data, and determining that the improper rewrite has been made if the comparison result is unmatched.

According to another aspect, the present invention which achieves these objectives relates to a method for determining whether or not the improper rewrite of stored data has been made, comprising steps of in storing the data, storing the data with a first storing time appended, inputting a password, extracting the first storing time from the stored data, generating a first code by converting the input password and the extracted first storing time in a predetermined procedure, restoring the data with the generated first code appended distinguishably, changing a second storing time appended to the restored data to the first storing time, and in reading the stored data, inputting the password, extracting the first storing time from the stored data, generating a second code by converting the input password and the extracted first storing time in the predetermined procedure, comparing the generated second code and the first code appended to the stored data, and determining that the improper rewrite has been made if the comparison result is unmatched.

According to another aspect, the present invention which achieves these objectives relates to a method for determining whether or not the improper rewrite of stored data has been made, comprising steps of in storing the data, storing the data with a first storing time appended, inputting a password, inputting the time information, generating a first code by converting the input password and the time information in a predetermined procedure, restoring the data with the generated first code appended distinguishably, changing a second storing time appended to the restored data to the time information, and in reading the stored data, inputting the password, extracting the time information from the stored data, generating a second code by converting the input password and the extracted time information in the predetermined procedure, comparing the generated second code and the first code appended to the stored data, and determining that the improper rewrite has been made if the comparison result is unmatched.

According to another aspect, the present invention which achieves these objectives relates to a method for determining whether or not the improper rewrite of stored data has been made, comprising steps of in storing the data, determining the user, generating a first code by converting the information corresponding to the determined user and the stored data in a predetermined procedure, storing the first code in correspondence to the stored data, and in reading the stored data, determining the user, generating a second code by converting the information corresponding to the determined user and the stored data in the predetermined procedure, comparing the generated second code and the first code stored corresponding to the stored data, and determining that the improper rewrite has been made if the comparison result is unmatched.

According to another aspect, the present invention which achieves these objectives relates to a method for determining whether or not the improper rewrite of stored data has been made and making the processing in accordance with the determined result, comprising steps of in storing the data, inputting a password, generating a first code by converting the input password and a predetermined portion of the stored data in a predetermined procedure, storing the first code in correspondence to the stored data, and in processing the stored data, inputting the password, generating a second code by converting the input password and the predetermined portion of the stored data in the predetermined procedure, comparing the generated second code and the first code stored in correspondence to the stored data, and executing the processing if the comparison result is matched, and prohibiting the execution of the processing if the comparison result is unmatched.

Other objectives and advantages besides those discussed above shall be apparent to the those skilled in the art from the description of a preferred embodiment of the invention which follows. In the description, reference is made to accompanying drawings, which forms a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 5 is a system configuration diagram in the second example.

FIG. 7 is a system configuration diagram in the third example.

FIG. 18 is a diagram showing the transition of time stamp in the fifth example.

DETAILED DESCRIPTION OF THE PREFERRED EMBODIMENTS

First Example

An example of the present invention will be described with reference to the drawings.

Figure 1:
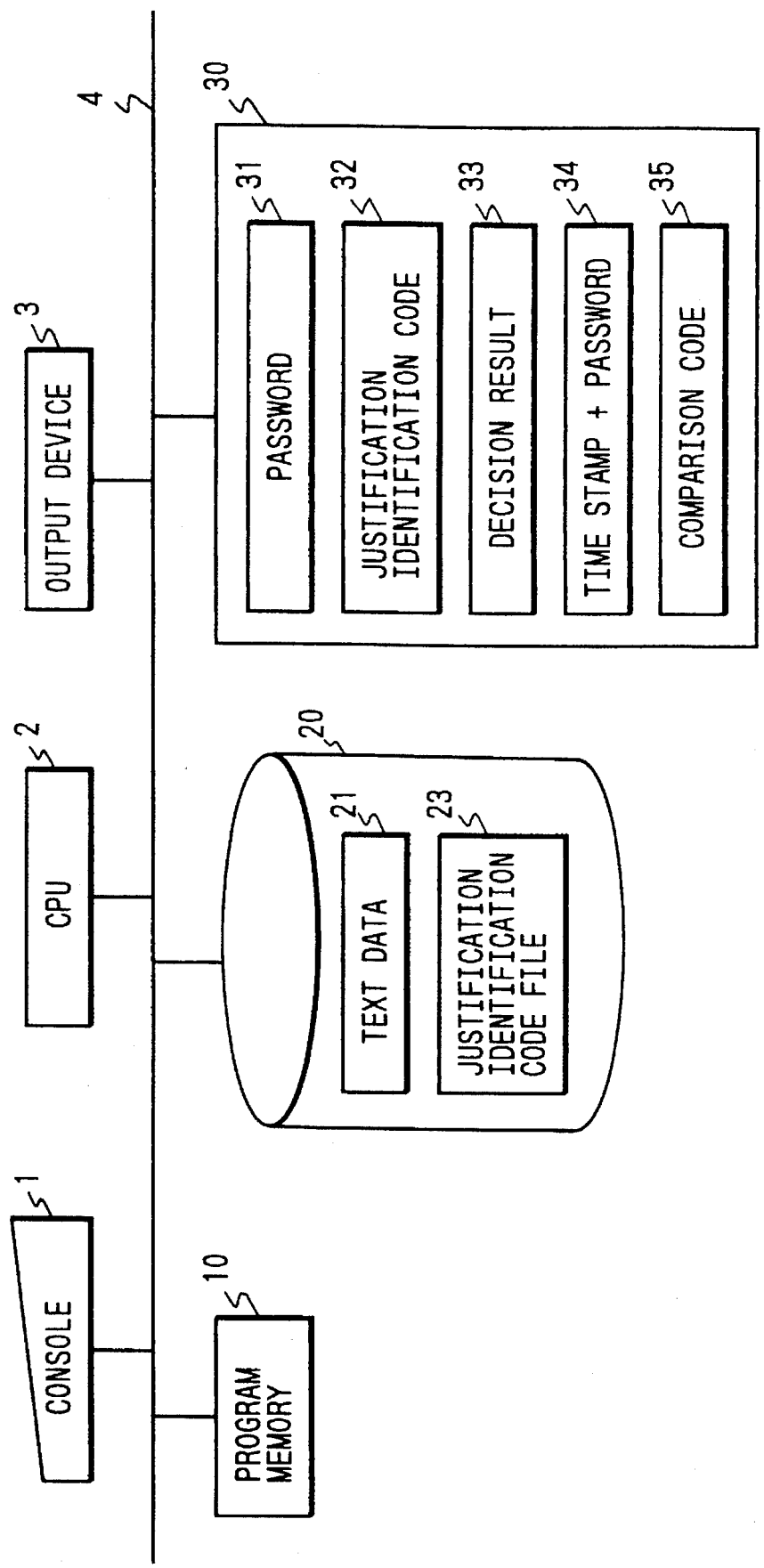
FIG. 1 is a system configuration diagram in the first example.

FIG. 1 is a diagram showing a system configuration of this example.

1 is a console having a device for the input to a computer (e.g., keyboard) and a device for the display of a response from the computer (e.g., CRT).

2 is a CPU for controlling each device via a bus 4 and executing various processes with processing programs stored in a program memory 10, and 3 is an output device for the print-out or the display on to a screen.

Figure 3:
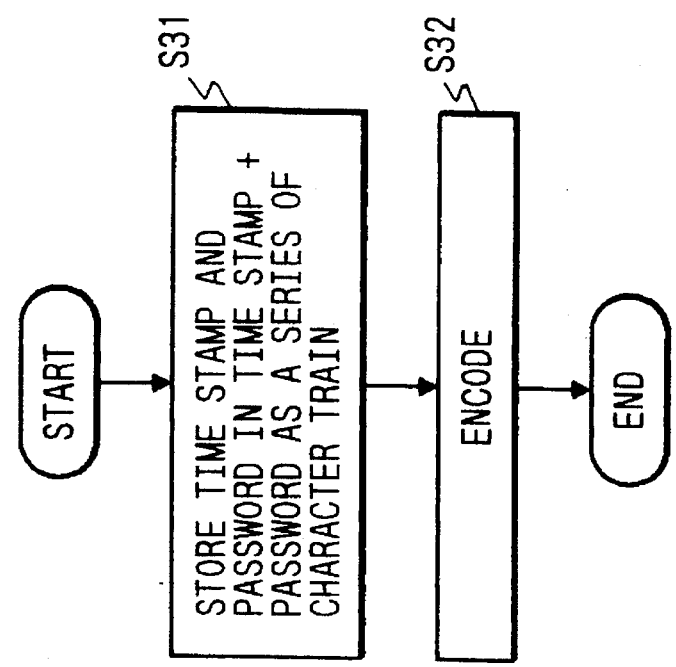
FIG. 3 is a flowchart for a code generating process in the first example.
Figure 2:
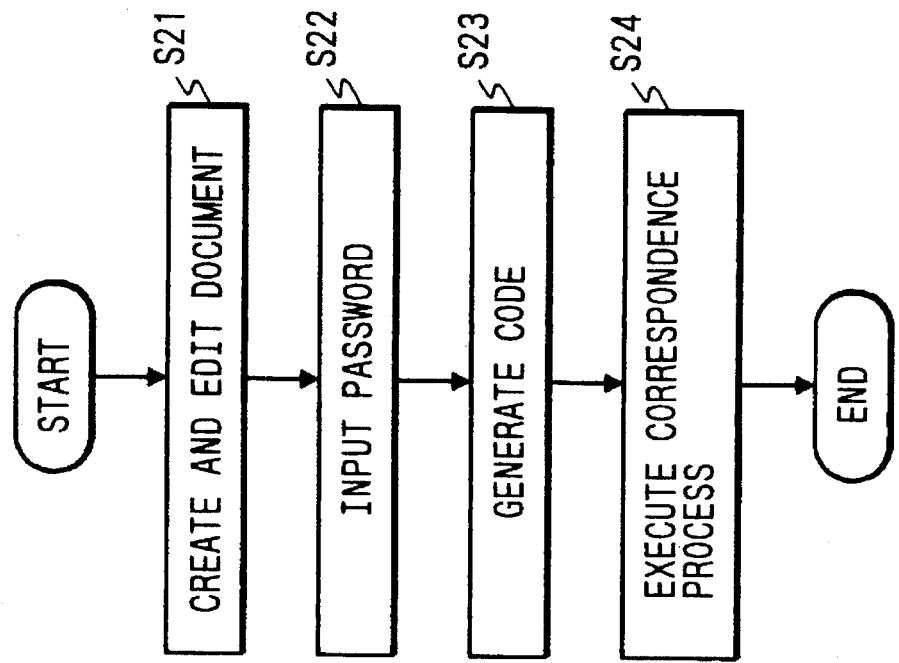
FIG. 2 is a flowchart for a document creating and registering process in the first example.
Figure 4:
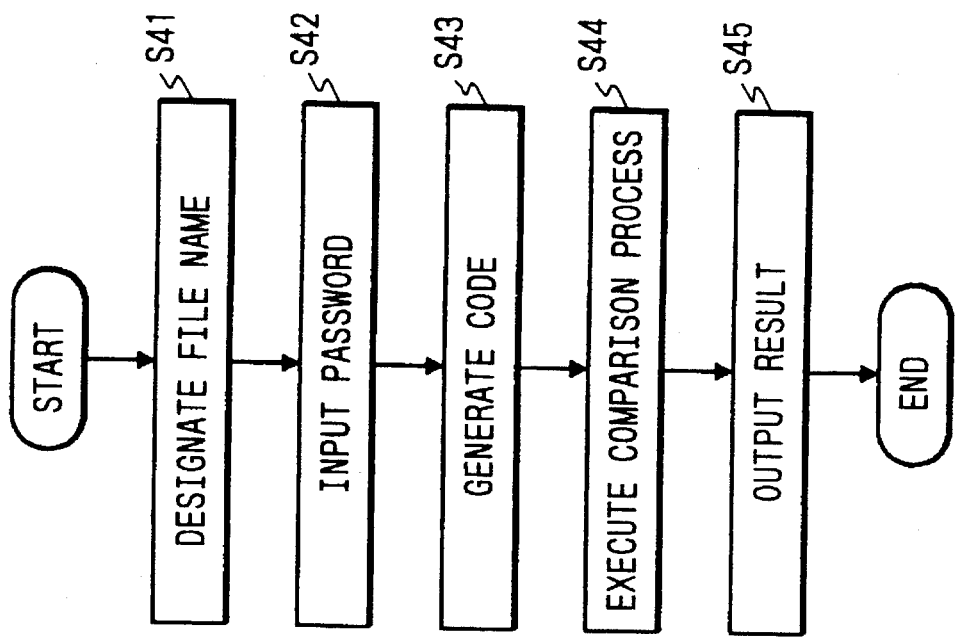
FIG. 4 is a flowchart for a justification identification process in the first example.

20 is a data memory such as FD or HD for storing a document data or a justification identification code file 23 as thereinafter described in the file format. 30 is a main memory composed of RAM or the like, in which an input password 31, a justification identification code 32 as thereinafter described, a determined result 33, time stamp + password 34, and a comparison code 35 are stored, and comprising various work areas for use in editing the document, for example. 10 is a main memory composed of ROM or the like for storing various processing procedures including the processing procedures corresponding to the flowcharts as shown in FIG. 2 to FIG. 4, herein referred to as a program memory. Note that it is unnecessary for these memories 10, 20, 30 to be physically separate.

Note that in the above and below, the content of data and the area on the memory for storing its data are not distinguished on the identification and the reference number, as long as particularly there is no trouble.

Next, the processing flow of this example will be described. The processing is largely divided into two parts of creating and registering the document and identifying the justification for the content.

FIG. 2 is a flowchart showing the flow of a document creating and registering process.

First, at step S21, the document creator created and edits a document using a console 1, and stores it into the document data 21 as a file. This is generally performed with a document creating/editing device called an editor.

With the above operations, the document data 21 stored in the memory 20 has a time stamp (final update time) at the time of creating the file appended. This is automatically performed by the operating system such as a unix.

Next, at step S22, a password of the document creator is obtained. Here, the document creator is requested to input the password through the console 1, and the password input therethrough is stored in the password 31 in the memory 30.

Next, at step S23, the time stamp appended to the file and the password is encoded to generate a justification identification code. This time stamp and the password may be only a byte train, rather than a character train.

This code generating process will be described using the flowchart of FIG. 3.

First, at step S31, the time stamp of the document data 21 and the password 31 are stored in time stamp + password 34 as a series of character train.

At step S32, the time stamp + password is encoded. This encoding means can be implemented with the same algorithm as in the encoding of password in unix, for example. This is to convert a character train into another character train with a method virtually not allowing the inverse conversion.

If this method only accepts the fixed-length character train (e.g., eight bytes), and the time stamp + password contains a character train exceeding that fixed-length, that character train needs to be made the fixed-length in the following way.

First, the time stamp + password is separated into each eight bytes.

Next, the exclusive OR (exclusive OR: EX-OR) thereof is taken sequentially. (The EX-OR of the first eight bytes and the next eight bytes is taken, and then the EX-OR of its result and the next eight bytes is taken. The following is continued in the same way.) If the remainder separated lastly is less than eight bytes, a measure for fill up the deficient bytes with blanks, for example, is taken.

With such a measure, the eight byte code can be eventually obtained. This is converted into a printable character code. In doing do, the inappropriate code (e.g., a line feed code) is appropriately converted. Encoding this character code allows an encoded character train specific to the document to be obtained.

Note that this encoding is not to limit the input or output to the character train, but may be handled only as the byte train.

The code generated therein is called a justification identification code, and stored in the justification identification code 32 of the memory 30.

At this time, the justification identification code 32 may be displayed on the console 1.

With the above operation, the code generating process is completed.

Next, at step S24 in FIG. 2, a correspondence process of the created document to the justification identification code is performed.

In this example, the justification identification code is stored in a file having an expander appended after the document name. That is, if the created document is a file with identified as "text", the justification identification code is stored in the justification identification code file 23 with a file name of "text.code". Thereby, the created document data file and the justification identification code file, in the mutually corresponding form, are stored in the memory 20.

The above operation is a process for creating and registering the document.

Subsequently, a justification identification process for confirming that the document thus registered is the same as at the time of creation will be described using the flowchart of FIG. 4.

In the memory 20, the document data file 21 and the file containing the justification identification code or the justification identification code file 23 are already stored.

First, at step S41, the file name for the identification is specified from the console 1. Next, at step S42, the password is input from the console 1 and stored in the password 31 of the memory 30.

Next, at step S43, the justification identification code is generated from the time stamp of the file of interest and the input password in the same procedure as at step S23 in FIG. 2, and stored in the justification identification code 32 of the memory 30. This justification identification code 32 is newly generated, and is different from the justification identification code 32 generated in the document creating and registering process.

Next, at step S44, the content ( character train) of the justification identification code file 23 corresponding to the specified document data is read into the comparison code 35, for the comparison between the code 35 and the content (character train) of the justification identification code 32 generated herein. Its result is identified as yes if they are equal, or otherwise no, for example, and stored in the decision result 33. At step S45, it is displayed as the character train of "yes" or "no" on the console 1 or a screen of the output device 3. Of course, this display may be arbitrarily made if the decision result can be distinguished. Also, this comparison result may be used as an input into a certain process.

Thereby, if the time stamp at the time of creation and the current time stamp which is lastly updated are coincident, and the password input at the time of creation and the current password are coincident, the document is determined as a valid (unaltered) one.

Accordingly, even if the update of document is made detectable with the change of the time stamp, and the content (code) of the justification identification code file 23 is rewritten with the time stamp at that time in some way in updating the document, the alteration of the document can be detected unless the same password as at the creation is not used in generating the code (i.e., the password is not known).

The above operation is the justification identification process.

With the above-described operation, it is possible to create and register the document in the form of allowing for the justification identification in later time, and confirm whether or not the document data is rewritten after the creation.

In this example, if the document is altered (or the time stamp is changed) after its registration even for once, the document is decided as "invalid".

Second Example

A second example of the present invention will be described.

In the first example, the justification identification code was generated from the time stamp appended to the document data file and the password input by the user, while in the second example, the justification identification code is generated from the character train which is a content of the document data file and the password input by the user.

Thereby, there is the advantage that the file can be decided as "valid" if the content of the document itself is not altered even though the file is updated (for example, the time stamp is changed as the file has been copied to another directory).

FIG. 5 is a diagram showing the system configuration in the second example.

Figure 6:
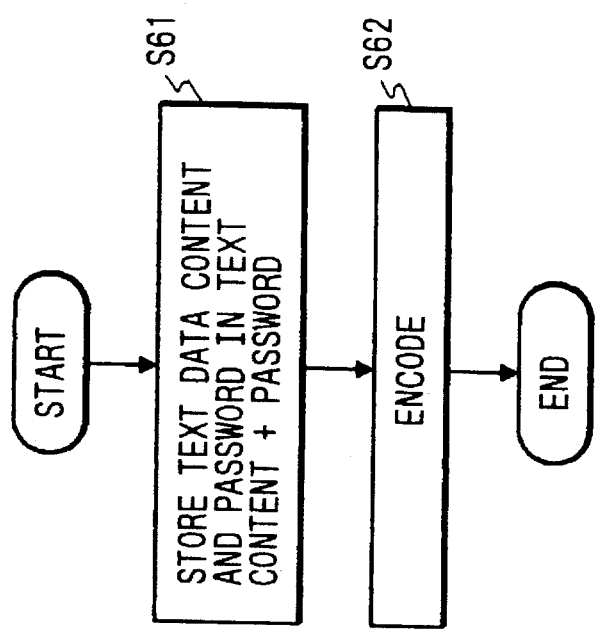
FIG. 6 is a flowchart for a code generating process in the second example.

The hardware constitution is not changed from that of FIG. 1, but the content of the memory is different in part. Specifically, the program memory 10 stores a processing procedure as shown in FIG. 6, instead of that of FIG. 3, and the main memory 30 is provided with text content + password 36, instead of time stamp + password 34 in FIG. 1.

Next, the processing flow of this example will be described. This example is also divided into two sections of a document creating/registering process and a justification identification process.

The processing flow of document creating/registering process is in accordance with FIG. 2.

The flow from step S21 to step S22 is the same as in the first example. As the code generating process at step S23 is different from the first example, the flow of the code generating process in this example will be described with reference to FIG. 6.

First, at step S61, the document content of the text data 21 and the password 31 are stored as a series of character train into text content + password 36. Note that the password and the text content may not be the character train but only the byte train.

Next, at step S62, the text content + password 36 is encoded. This encoding procedure is the same as in the first example.

The generated code (justification identification code) is stored in the justification identification code 32 of the memory 30.

The above operation is the code generating process.

Next, at step S24, the correspondence process of the justification identification code 32 to the text data 21 is executed, in the same way as in the first example.

The above operation is the document creating/generating process.

Subsequently, the justification identification process for confirming that the document thus registered is the same as created.

This process is basically the same as in the example 1, and in accordance with FIG. 4.

However, the processing at step S43 is different in that the justification identification code is generated from the text content of the file of interest and the password input at step S42, in the same procedure as at step S61 and S62.

In this example, there is the effect that even if the created document file is rewritten by someone after the registration, it can be decided as valid if the content is restored eventually. This is effective when it is only necessary that the document content is the same. This is also effective because it can be confirmed that the document content is the same as original even if the owner or the file updating data is changed.

Third Example

In the first and second examples as above described, the justification identification code is provided as a file independent of the corresponding document file, while in the third example, the document data and the justification identification code thereof are stored in the same file.

FIG. 7 is a system configuration diagram in the third example.

The hardware constitution is not changed from that of FIGS. 1 and 5, but the content of the memory is different in part. Specifically, the program memory 10 stores a processing procedure as shown in FIGS. 2, 4, 8, 10 and 11, and the main memory 30 is the same in FIG. 5, but the data memory 20 does not have the justification identification code file.

Next, the processing flow of this example will be described. In this example, the process is also divided into two selections of a document creating/registering process and a justification identification process.

The processing flow of document creating/registering process is in accordance with FIG. 2, like the previous examples.

In this example, like the second example, the justification identification code 32 is generated from the text content and the input password.

The feature of this example is a correspondence process as at step S24.

Figure 8:
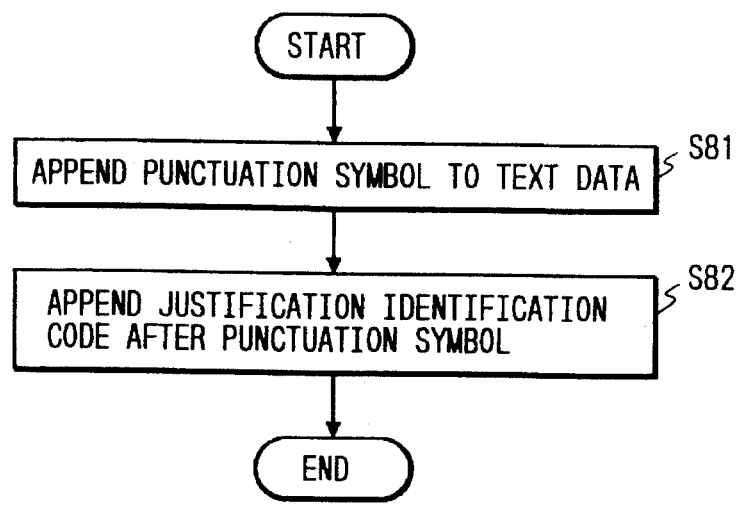
FIG. 8 is a flowchart for a correspondence process in the third example.

The correspondence process of the created document to the justification identification code will be described with reference to FIG. 8.

By the time of this step, the document data and justification identification code are stored in the text data 21 and the justification identification code 32, respectively.

Figure 9:
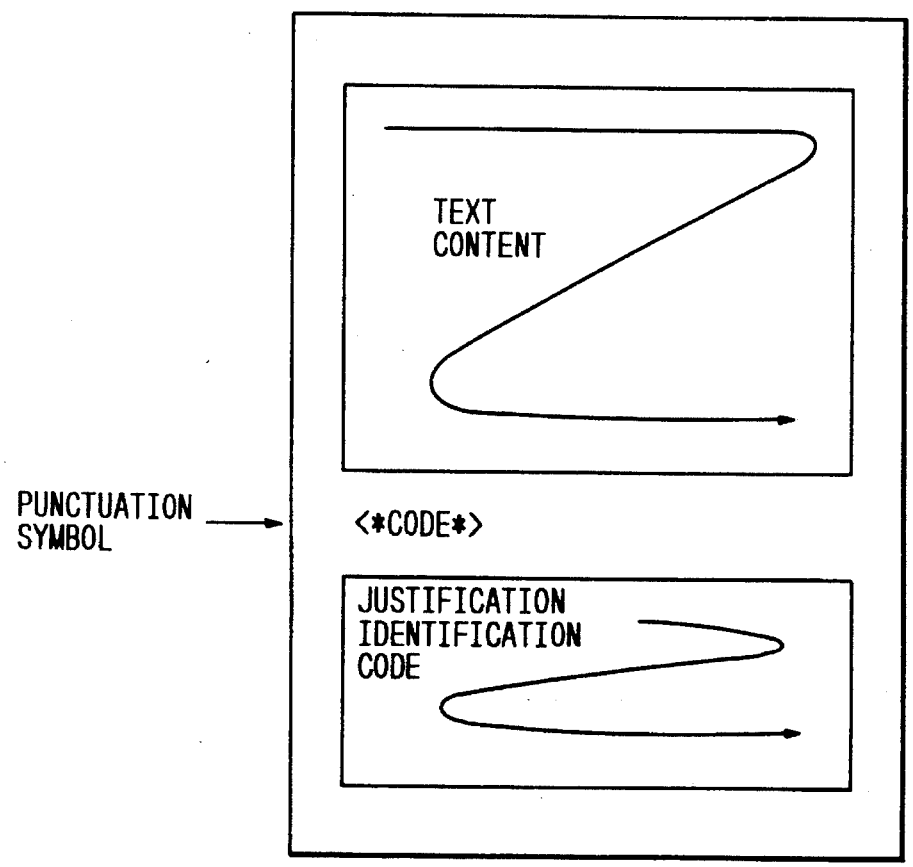
FIG. 9 is a view showing an example of document data with a justification identification code appended.

In this example, the text data and the justification identification code are stored in one file in the form of being distinguishable from each other (for example, a punctuation symbol is interposed therebetween as shown in FIG. 9). At step S81, a specific text punctuation symbol, for example, a line only consisting of a character train of <*code*>, is appended to the file end of the text data.

Here, if the character train of <*code*> is used in the document, rather than as the text punctuation symbol, care must be taken out to have the line only consisting of the character train of <*code*>. At step S82, the justification identification code 32 is further appended to the file end of the text data 21.

With the above operation, in the text data 21, the content of original document, and the justification identification code thereof exist in one file so as to be distinguishable with the text punctuation symbol of <*code*>.

Thus, step S24 is finished. The above operation is the document creating/registering process.

Subsequently, the process for confirming that the document is the same as created will be described.

This process is in accordance with FIG. 4, like the previous examples.

In this example, the text data file (including the justification identification code for that text) is already stored in the memory, when starting this process.

First, the steps S41 and S42 are the same as in the previous examples.

Next, in the code generation at step S43, the justification identification code is generated from the text data file 21 of interest and the password 31, with the encoding, and stored in the justification identification code 32.

Figure 10:
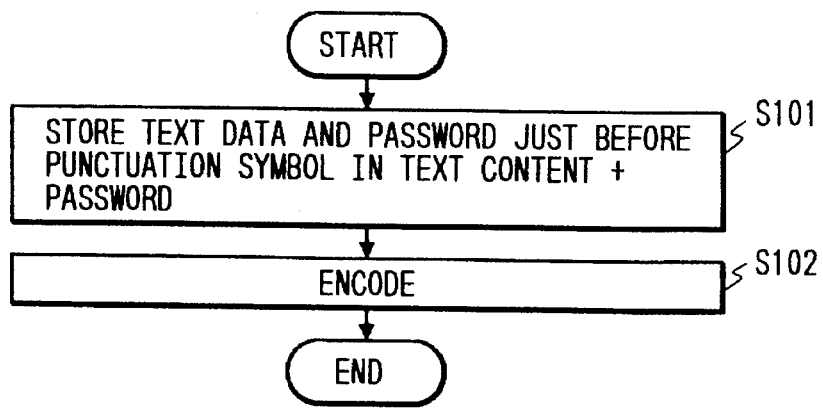
FIG. 10 is a flowchart for a code generating process in the third example.

This code generating process will be described with reference to FIG. 10. This process is slightly different from the code generating process performed at the time of creating and registering the document.

First, at step S101, the character train just before the punctuation symbol <*code*> in the text data 21 and the character train stored in the password 31 are stored in text content + password 36 as a series of character train.

Next, at step S102, the text content + password 36 is encoded, and stored in the justification identification code 32. Here, the encoding method for the character train may be the same as in the previous examples.

Thus, the code generating process at step S43 has been described.

Next, at step S44, the comparison between the content (character train) of the justification identification code created beforehand and stored in the same file as the text data and the content (character train) of the justification identification code 32 created at step S43 is made.

Figure 11:
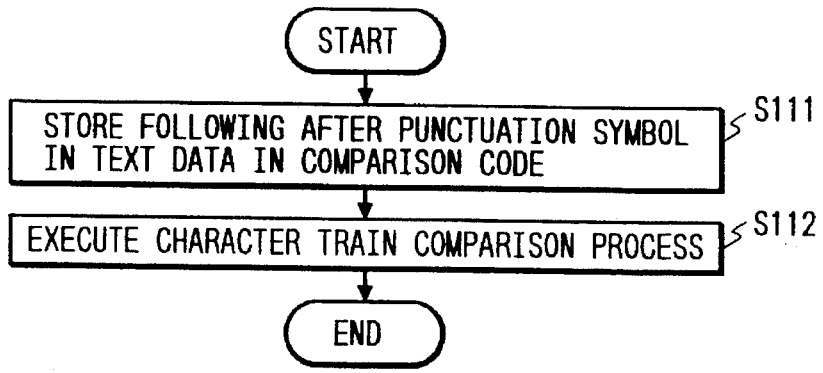
FIG. 11 is a flowchart for a comparison process in the third example.

This process will be described with reference to FIG. 11.

At step S111, the text data in the text data file from immediately after the text punctuation symbol until the file end is read and stored in the comparison code 35 of the memory 30.

At step S112, the comparison between the content of the comparison code 35 and the content of the justification identification code 32 is made, in which yes if equal and no if otherwise is stored in the decision result 33.

The above operation is the comparison decision process at step S44.

Next, at step S45, the content of the decision result 33 is displayed on the console 1 or the screen of the output device 3, for example, as the character train of "yes". Also, this may be used as the input into a certain process.

Thus, the justification identification process is completed.

In this example, there is the same effect as in the second example because the text content is used for the generation of the justification identification code, and there is a further effect that the file management can be facilitated by making the text data and the justification identification code in one file.

With the present invention, there is provided the effect that it can be confirmed whether or not the text content has been rewritten for a text file, as above described.

Fourth Example

When the code is created from the input password and the last updated time of the text, as in the first example, the addition of the code is the update of the text data if the justification identification code including the time and the text data are stored in the same text data, as in the third example, so that the time information (last update time at the code generation) in the justification identification code and the time stamp (update time of appending the generated code) in the text data are inconsistent, whereby there is the problem that even if the confirmation is made in this state, the rewrite is always determined, and it can not be decided whether or not the improper rewrite has been made.

In this example, the justification identification code and the text are stored in the same text in the form of being distinguishable from each other, in which the time stamp of the created document is made coincident with the time in the code, so that the consistency with the time information contained in the code is retained to allow the code for confirming the alteration of the text content to be stored in the same file as the text.

Figure 12:
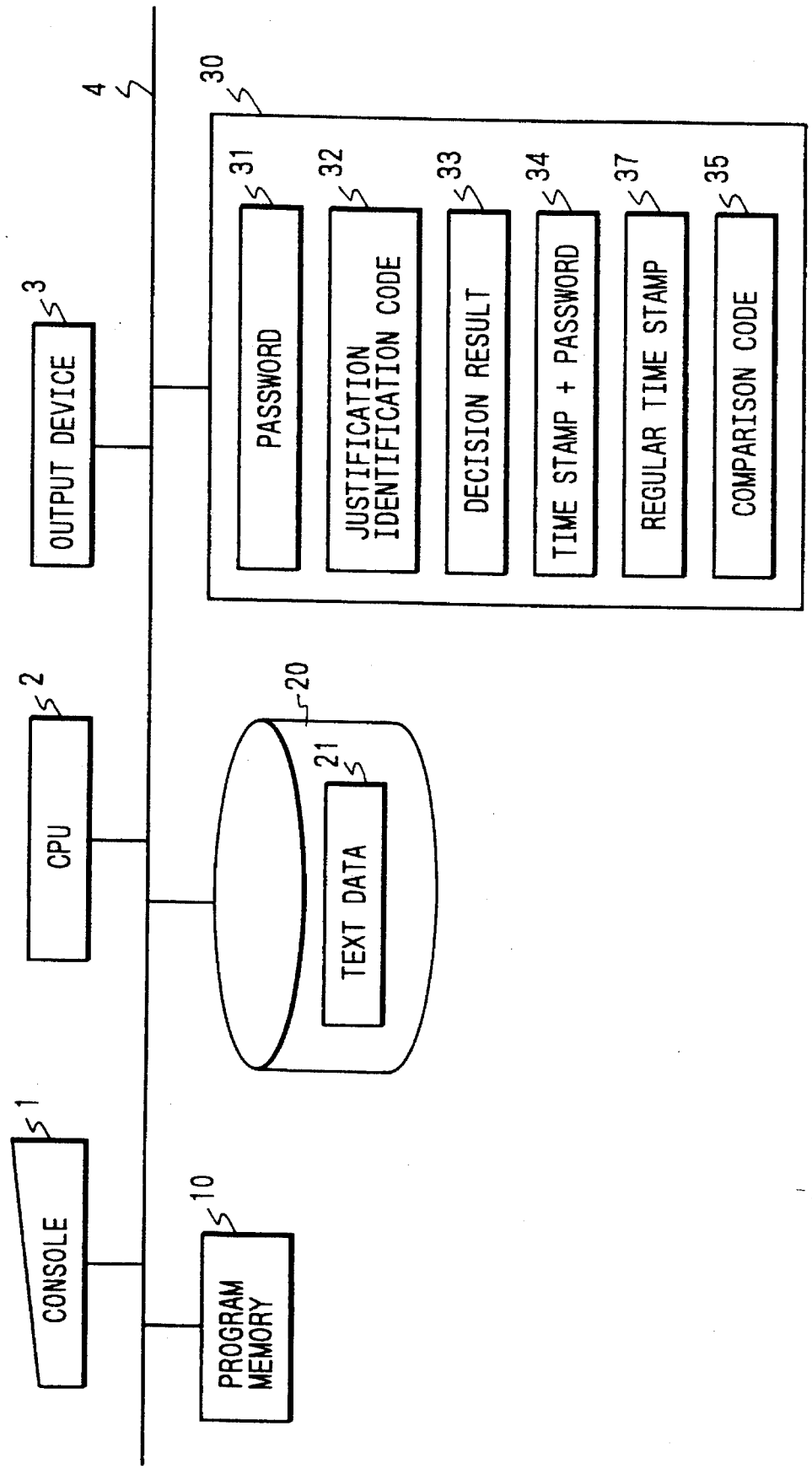
FIG. 12 is a system configuration diagram in the fourth example.

FIG. 12 is a system configuration diagram in this example.

It is different from FIG. 1 in the content of the program memory 10 and in that a regular time stamp 37 as will be described later is provided in the main memory 30.

Next, the processing flow of this example will be described. The process is also divided into two sections of a document creating/registering process and a justification identification process for the text content.

The processing flow of document creating/registering process is in accordance with the flowchart of FIG. 2, like the previous examples.

In the flow, the process up to the code generation is the same as in the first example, and the explanation will be described.

Next, at step S24, the process of creating the text data 21 including the justification identification code 32 by appending the justification identification code 32 to the document data 21 is performed.

The correspondence process will be described with reference to FIG. 13.

Before the step S24, the document data 21 and justification identification code 32 are stored. In this example, the text data followed by the justification identification code is stored in one file in the form of being distinguishable from each other (for example, a punctuation symbol is interposed therebetween) (FIG. 9).

At step S131, the time stamp of the text data 21 is fetched and stored as the regular time stamp 37 of the text data 21.

At step S132, a specific text punctuation symbol, for example, a line only consisting of a character train of <*code*>, is appended to the file end of the text data.

Accordingly, if the character train of <*code*>, is used as the text content, rather than the text punctuation symbol, care must be taken not to produce the line only consisting of the character train of <*code*>.

At step S133, the justification identification code 32 is further appended to the file end of the text data 21.

With the above operation, in the text data 21, the content of original document, and the justification identification code thereof exist in one file in the form of being distinguishable with the text punctuation symbol of <*code*>.

However, the time stamp of the text data 21 has been updated with the process of appending the punctuation symbol and the justification identification code at steps S132 and S133, and is different from the time stamp at the time of generating the justification identification code 32, so that the time stamp written in the justification identification code 32 and that in the text data 21 are inconsistent.

Thus, at step S134, the time stamp of the text data 21 is replaced with the regular time stamp 37, so that the time stamp used for the generation of the justification identification code 32 and that in the text data 21 is held consistent.

This time stamp replacement process can be implemented, for example, by using "utime" (a system call for altering the time stamp of the file) which is one of the system calls in the UNIX operating system.

Figure 13:
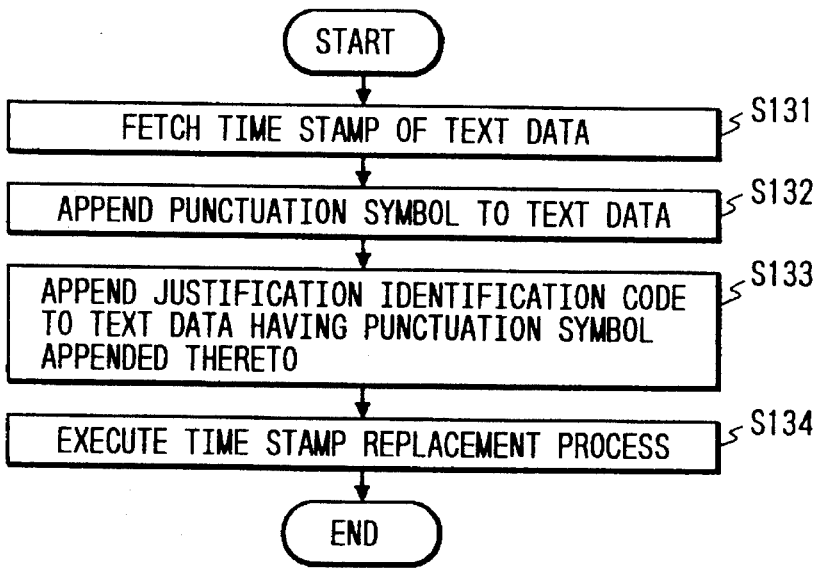
FIG. 13 is a flowchart for a correspondence process in the fourth example.
Figure 14:
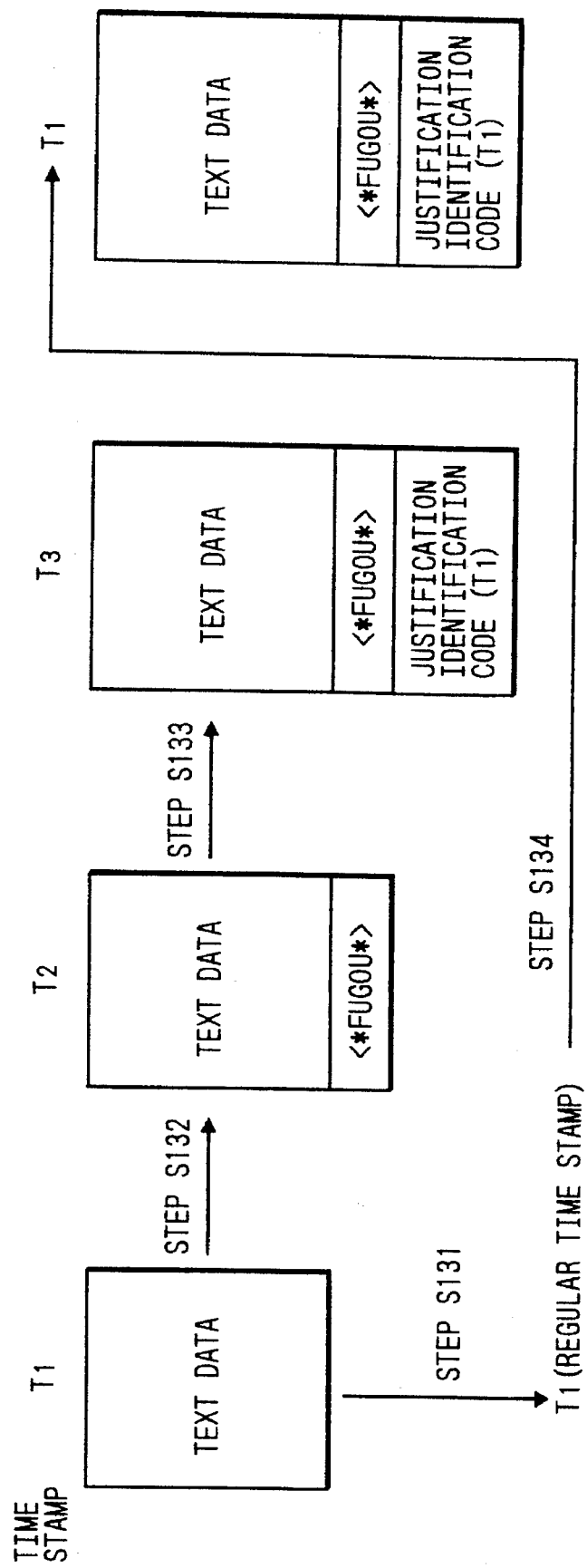
FIG. 14 is a diagram showing the transition of time stamp in the fourth example.

FIG. 14 shows the transition state for the text data and the time stamp in each step of FIG. 13 in the correspondence process of the text data to the justification identification code, as described in FIG. 13.

The above operation is the document creating and registering process.

The process for identifying the justification for the registered text can be performed in the same way as in the third example, using the text data 21 (including the justification identification code for that text).

With this example, there is the effect that the management is facilitated because the identification code generated using the time information can be stored in the same one file as the original text, using the time information appended to the text data for the identification of text justification.

Fifth Example

In the previous examples, the time stamp used in generating the justification identification code was the time stamp of the text data 21 originally created. This example is characterized in that arbitrary time can be set as the time stamp in generating the justification identification code.

Figure 15:
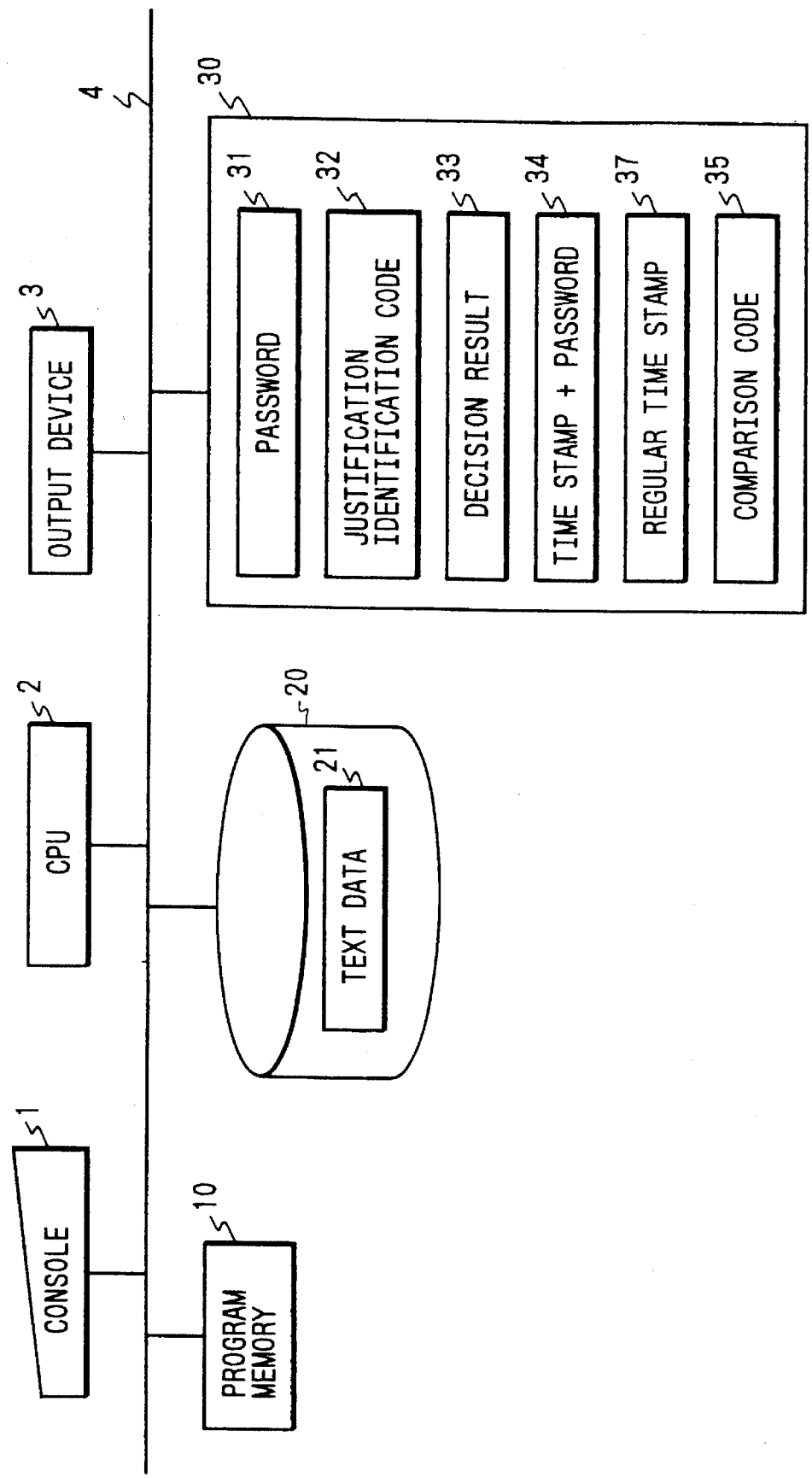
FIG. 15 is a system configuration diagram in the fifth example.

FIG. 15 is a system configuration diagram of this example.

The hardware constitution is the same as in FIG. 1, except that the user can input an arbitrary time information for the time stamp from the console 1, and the processing procedure for appending the time stamp based on the input information is provided in the memory 10, and therefore the detailed explanation for other portions will be omitted.

The processing flow of this example is substantially the same as in the fourth example, but different from the previous examples in the justification identification code generating process and the correspondence process of the text data to the justification identification code, which is a feature of this example.

Figure 16:
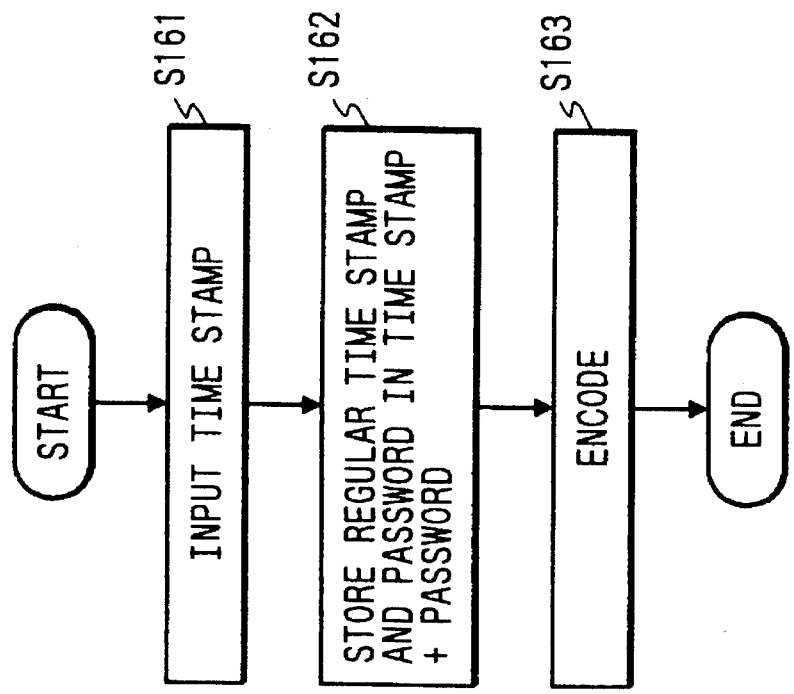
FIG. 16 is a flowchart for a code generating process in the fifth example.

The justification identification code generating process will be described with reference to FIG. 16.

First, at step S161, an arbitrary time is input from the console 1, and its result is stored in the regular time stamp 37. For example, the current time may be used as the regular time stamp, by inputting "now", or the free time (year/month/date/minute/second) may be set.

Then, like the fourth example, at steps S162 and S163, the regular time stamp 37 and the password 31 are stored in time stamp + password 34, and encoded to generate the justification identification code, which is then stored in the justification identification code 32 of the memory 30. With the above operation, the justification identification code generating process is completed.

Next, the correspondence process will be described with reference to FIG. 17.

It is also supposed, like the previous examples, that the text data 21 and the justification identification code 32 have been already stored at the time of performing the correspondence process.

Also, in this example, the justification identification code is stored after the text data in one file in the form of being distinguishable from each other (for example, a punctuation symbol is interposed therebetween) (FIG. 9), like the fourth example.

At step S171, a specific text punctuation symbol, for example, a line only consisting of a character train of <*code*>, is appended to the file end of the text data 21. If the character train of <*code*> is used as the text content, rather than the punctuation symbol, care must be taken not to produce the line only consisting of the character train of <*code* >.

At step S172, the justification identification code 32 generated at step S163 is further appended to the file end of the text data 21.

With the above operation, in the text data 21, the content of original document, and the justification identification code thereof exist in one file in the form of being distinguishable with the text punctuation symbol of <*code* >. However, the time stamp of the text data 21 has been updated with the process of appending the punctuation symbol and the justification identification code in the same procedure as at steps S132 and S133 of the fourth example, and is different from the time stamp at the time of generating the justification identification code 32. Accordingly, the time stamp written in the justification identification code 32 and that in the text data 21 are inconsistent.

Thus, using the time stamp replacement process at step S173, the time stamp of the text data 21 is replaced with the regular time stamp 37, so that the time stamp written in the justification identification code 32 and that in the text data 21 is held consistent. With the above operation, the correspondence process is completed.

Here, the regular time stamp 37 is one as set with the time stamp input at step S161. This time stamp replacement process can be implemented, like the previous example, by using the system call "utime".

Figure 17:
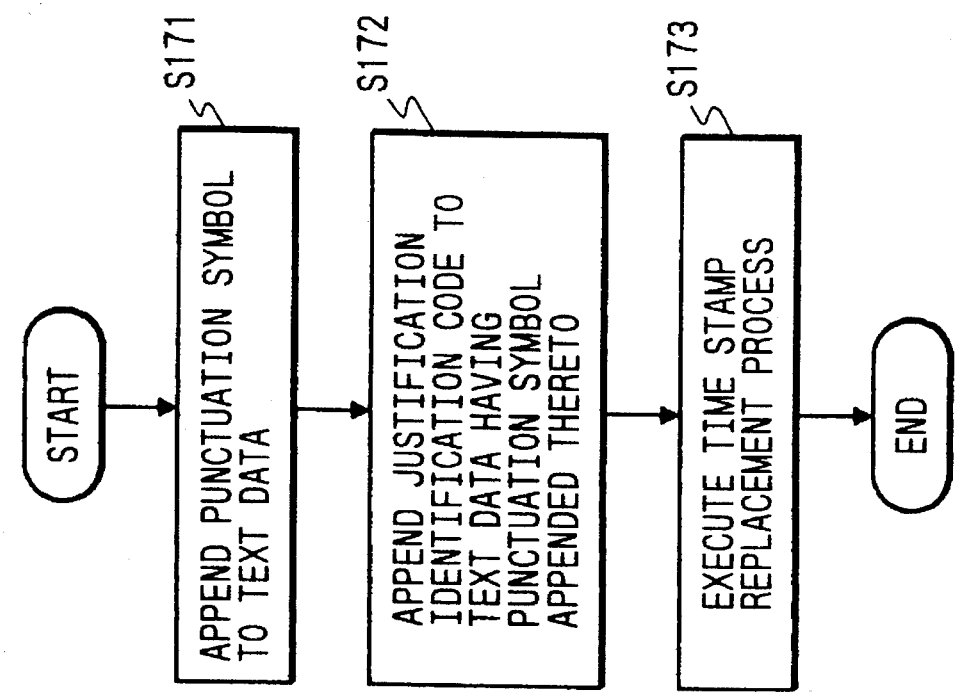
FIG. 17 is a flowchart for a correspondence process in the fifth example.

FIG. 18 shows the transition state for the text data and the time stamp in each step of FIG. 17 in the correspondence process of the text data to the justification identification code, as described in FIG. 17.

With this example, there is the effect that the time stamp of the text data which constitutes a part of the justification identification code can be freely set irrespective of the current time.

Sixth Example

With the previous examples there is a problem that when a plurality of documents are required to be sequentially confirmed, the input operation for the password is complex.

In this example, the identification code is generated using the information of identifying the user not dependent on the text, instead of the password for each text.

Figure 19:
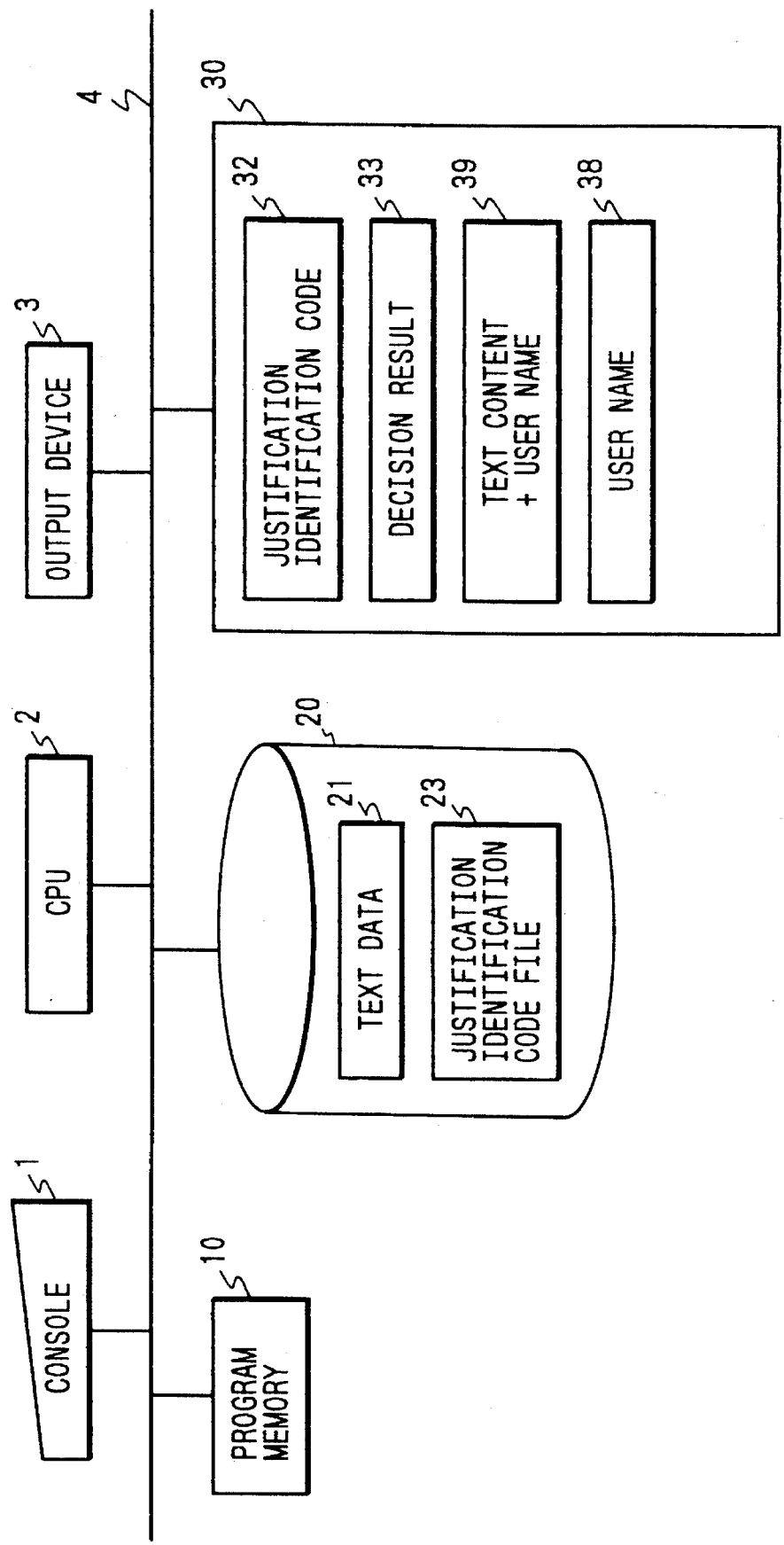
FIG. 19 is a system configuration diagram in the sixth example.

FIG. 19 is a system configuration diagram of this example.

This system is only different from FIG. 5 in the content of the program memory 10, and in that the main memory 30 is provided with a user name 38 as will be described later and a text content + user name 39, instead of the password 31 and the text content + password 36.

The processing flow of this example is largely divided into two sections of a document creating and registering process and a justification identification process for the content.

Figure 20:
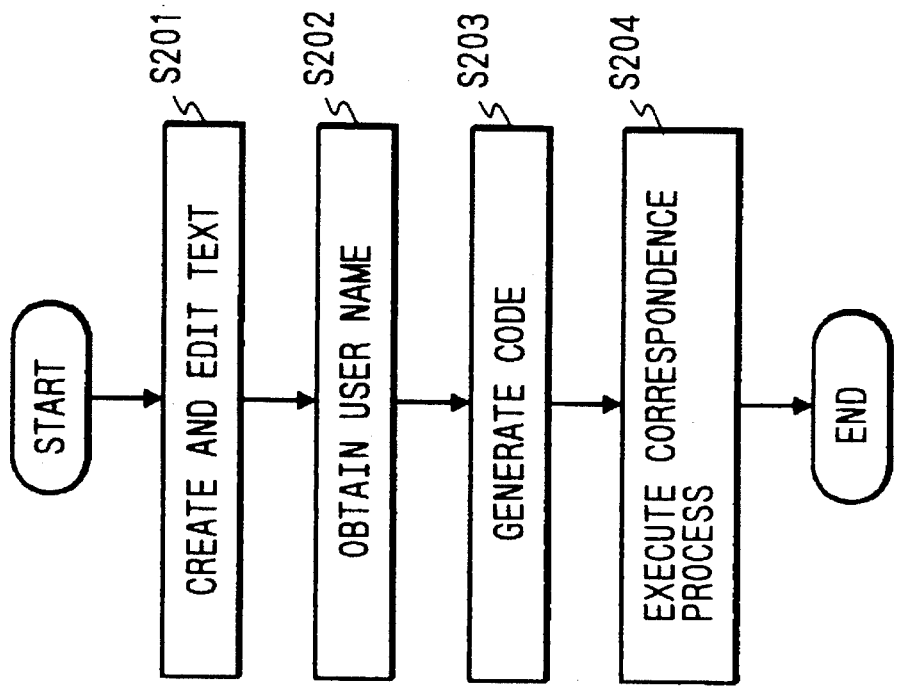
FIG. 20 is a flowchart for a document creating and registering process in the sixth example.

FIG. 20 is a flowchart showing the document creating and registering process.

First, at step S201, the text is created and edited, and stored in the text data 21 as a file, like the previous examples.

Next, at step S202, the user name of the text creator is obtained, and stored in the user name 38. This is obtained with a whoami command in the unix, C-shell, for example.

Figure 21:
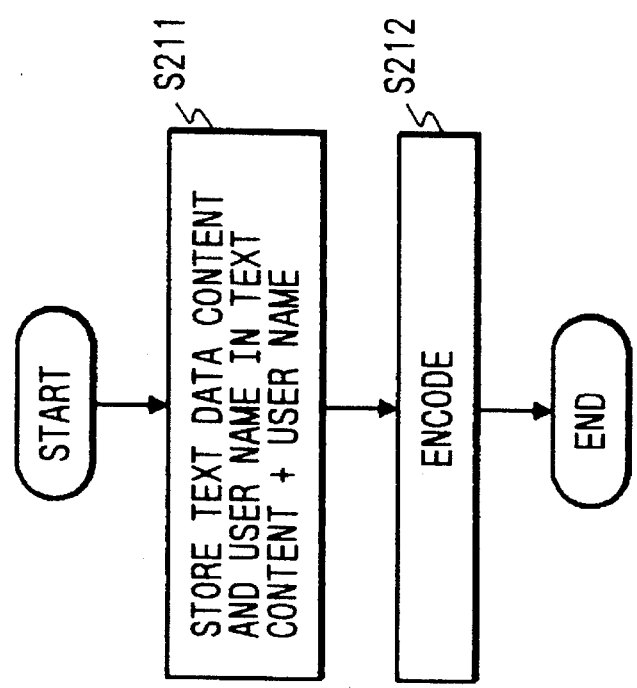
FIG. 21 is a flowchart for a code generating process in the sixth example.

At step S203, the justification identification code is generated by encoding the content of the text data 21 and the character train stored in the user name 38. This code generating process can be executed with a procedure of storing the content of the text data 21 and the user name 38 into the text content + user name 39 as a series of character train (step S211), and encoding the text content + user name 39 (step S212), as shown in FIG. 21. This is fundamentally the same as in FIG. 3, and the detailed explanation will be omitted. The generated code is stored as the justification identification code 32, and the code generating process is completed.

At step S204, the correspondence process of the created text to the justification identification code is executed. This can be performed like the first example, and the correspondence of the text data to the justification identification code can be done by storing the justification identification code into the file having the file name of the text file name followed by the expander. Thus, the created text data 21 file and the justification identification code file 23 have been stored in the memory 20 in the mutual corresponding form. The above operation is the text creating and registering process.

Figure 22:
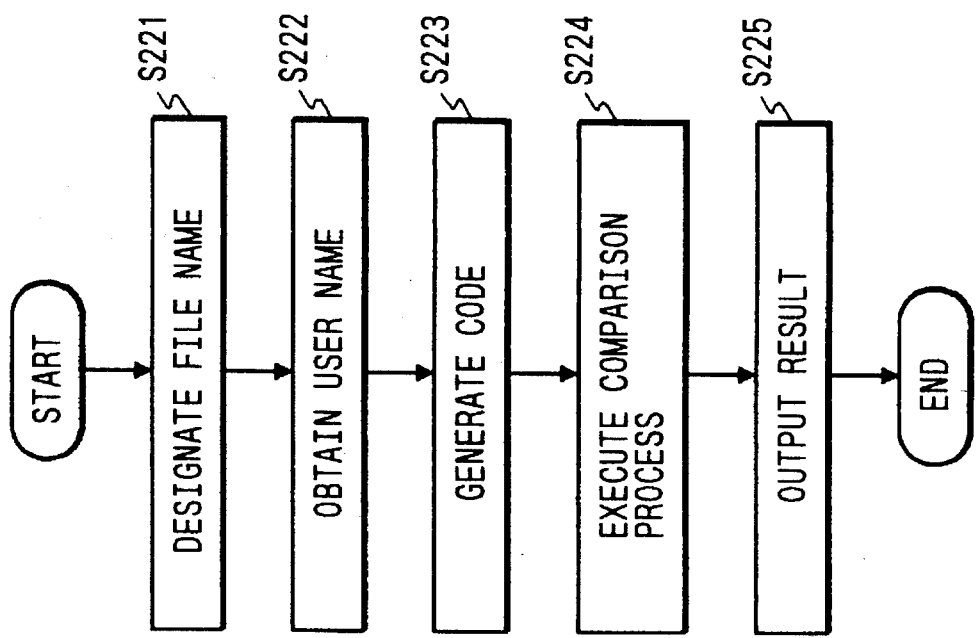
FIG. 22 is a flowchart for a justification identification process in the sixth example.

Subsequently, the process of confirming whether or not the text thus registered is the same as created will be described with reference to FIG. 22. This process is fundamentally the same as in FIG. 4, except that the user name is obtained (step S222), instead of the password input (step S42) of FIG. 4, and therefore the step S222 will be only described. In this step, a user name of the user to perform the identification process is obtained and stored in the user name 38 of the memory 30. This is the same as at step S202 of FIG. 20.

Then, the justification identification code is generated from the content of specified text data 21 and the user name 38, and compared with the content of justification identification code file 23 corresponding to the specified text data, in which yes if they are equal, or no if otherwise is displayed on the screen of the console 1. This result may be also used as the input into a certain process.

With this example, the registration and identification operation for a plurality of texts can be simplified, because the input of the password is unnecessary for each text as above described.

Seventh Example

Figure 23:
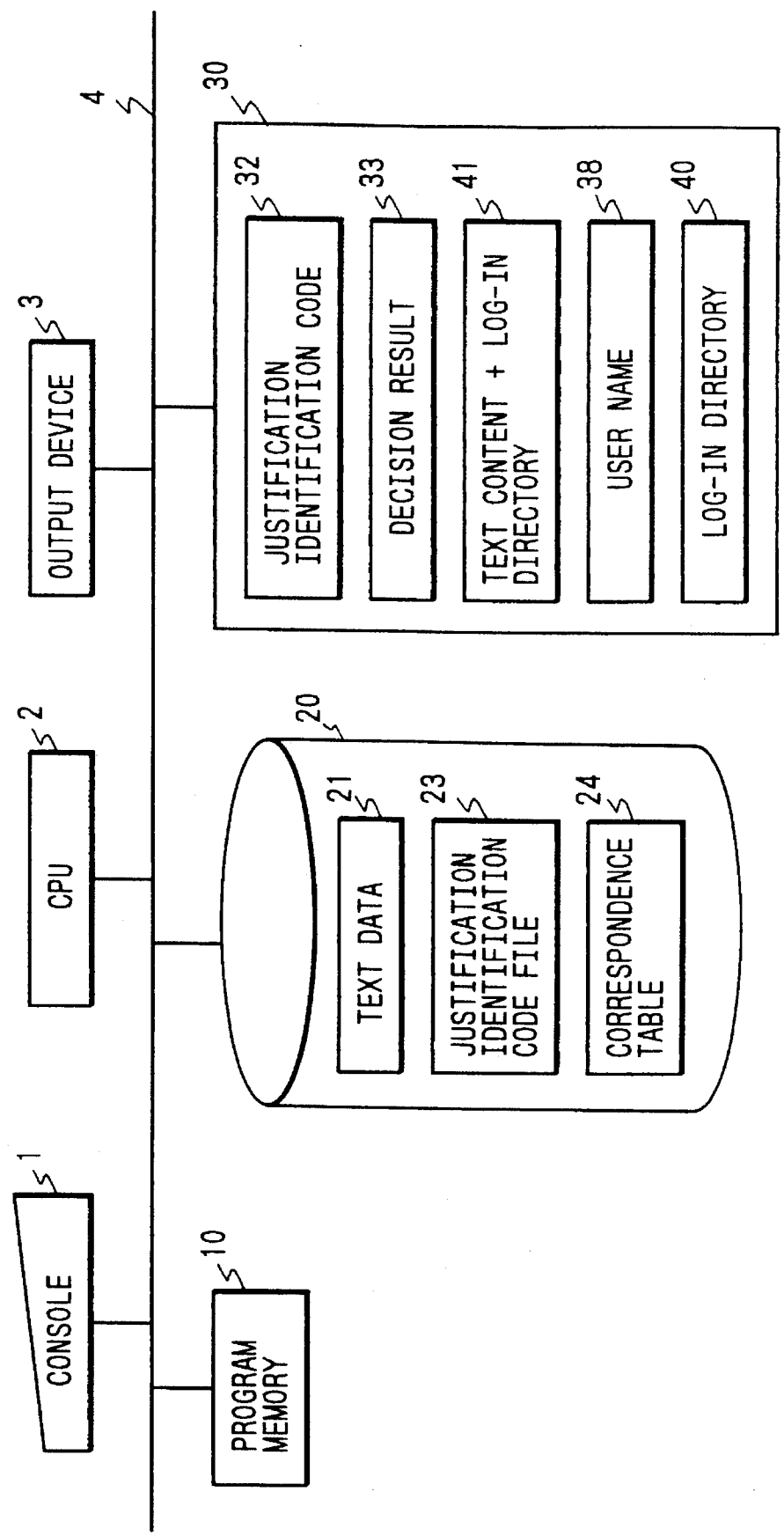
FIG. 23 is a system configuration diagram in the seventh example.

FIG. 23 is a system configuration diagram of this example.

The hardware constitution is not different from FIG. 19, but the memory is different in part. Specifically, the program memory 10 stores a processing procedure of this example, the main memory 30 has a log-in directory 40, and a text content + log-in directory 41, instead of the text content + user name 39 as shown in FIG. 19, and the data memory 20 has a correspondence table 24 as will be described later.

The processing flow of this example is largely divided into two sections of a text creating/registering process and a justification identification process for the content.

Figure 24:
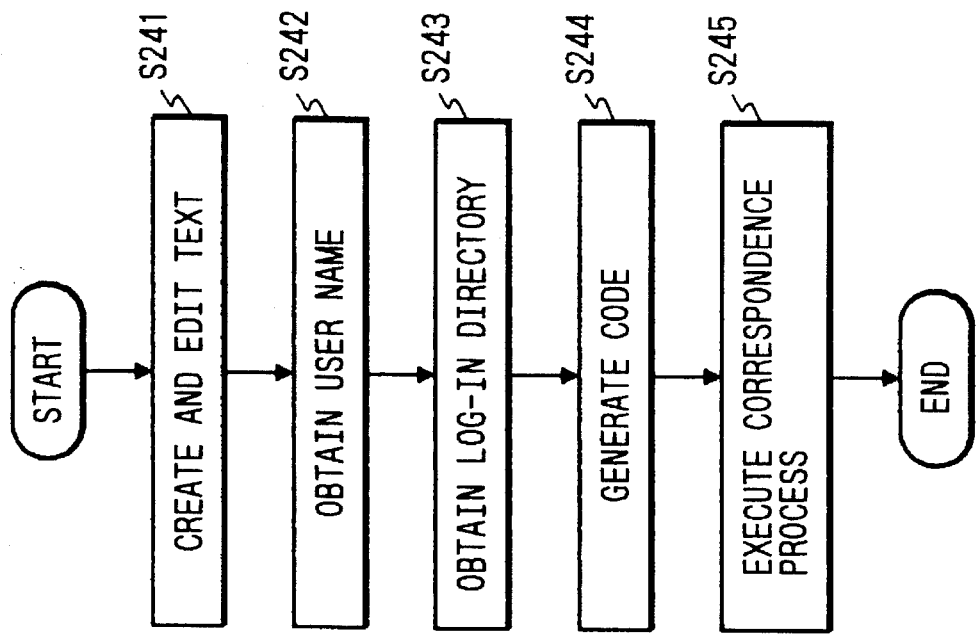
FIG. 24 is a flowchart for a document creating and registering process is the seventh example.

FIG. 24 shows a processing flow for the text creating/ registering process.

First, at step S241, the text is created and edited, and at step S242, a user name of the text creator is obtained. This portion is the same as steps S201 and S202.

Next, at step S243, the log-in directory of the text creator is obtained from the user name obtained at step S242 and the correspondence table 24, and stored in the log-in directory 40. The correspondence table 24 is a correspondence table between the user name and the log-in directory, and equivalent to a/etc/passwd file in the unix system. In the/etc/ passwd/file, the first field indicates the user name and the sixth field indicates the log-in directory.

Figure 27:
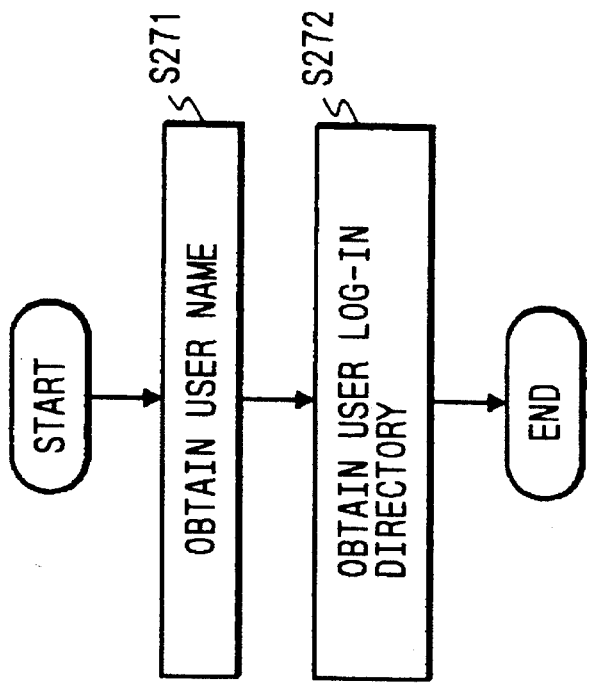
FIG. 27 is a flowchart for a log-in directory fetching process.

The step of fetching the log-in directory will be described with reference to FIG. 27.

First, at step S271, the log-in name of the user is stored in the user name 38. The log-in name can be obtained by using a whoami command of C-shell in the unix system.

Next, at step S272, the log-in directory corresponding to the user name 38 obtained at step S271 is obtained using the correspondence table 24 describing the correspondence relation between the user name and the log-in directory, and stored in the log-in directory 40.

Figure 25:
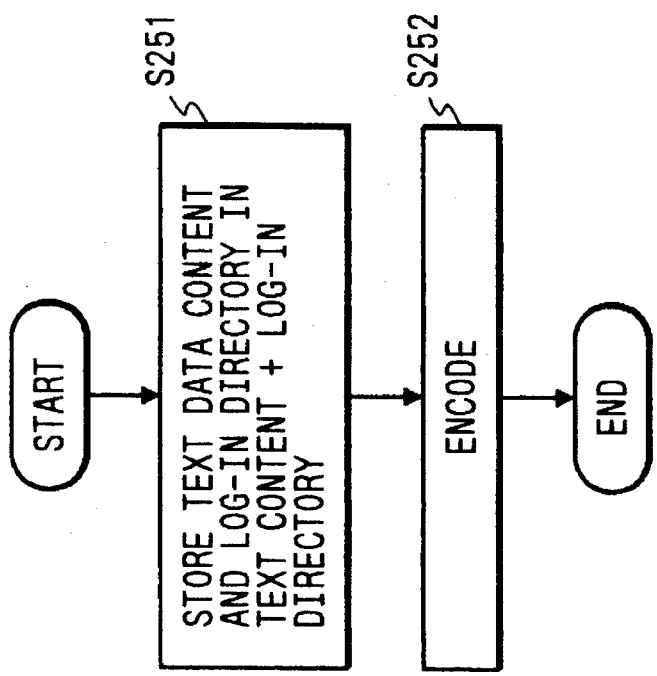
FIG. 25 is a flowchart for a code generating process in the seventh example.

At step S244, the content of the text data 21 and the character train stored in the log-in directory 40 are encoded to generate the justification identification code. This code generating process is to store the content of the text data 21 and the log-in directory 40 into the text content + log-in directory 41 as a series of character train at step S251, and encode the character train stored in the text content + log-in directory 41 at step S252, as shown in FIG. 25. The generated code is stored as the justification identification code 32, and the code generating process is completed.

At step S204, the correspondence process of the created text to the justification identification code is executed. In this example, like the first example, the created text data 21 file and the justification identification code file 23 can be stored in the memory 20 in the mutually corresponding form by storing the justification identification code into the file having the file name of the text file name followed by the expander. Thus, the created text data 21 file and the justification identification code file 23 have been stored in the memory 20 in the mutual corresponding form. The above operation is the text creating and registering process.

Figure 26:
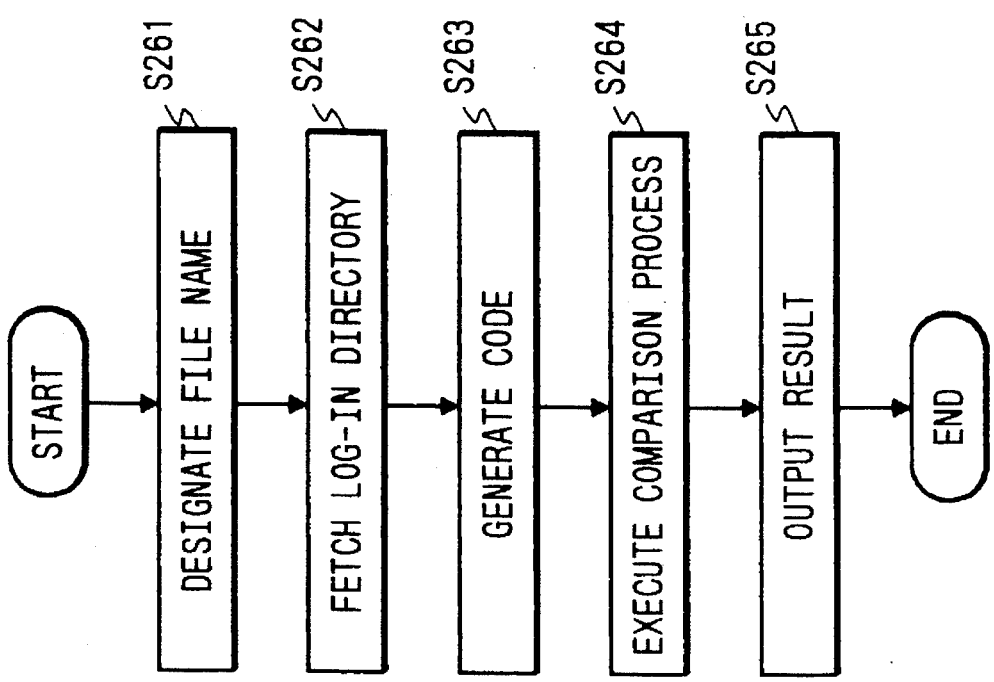
FIG. 26 is a flowchart for a justification identification process in the seventh example.

Subsequently, the process of confirming whether or not the text thus registered is the same as created will be described with reference to FIG. 26. This process is fundamentally the same as in FIG. 4, except that the log-in directory is fetched (step S262), instead of the password input (step S42) of FIG. 4, and therefore the step S262 will be only described. In this step, a log-in directory of the user to perform the identification is obtained and stored in the log-in directory 40 of the memory 30. This is the same as at steps S242 and S243 of FIG. 20.

Then, the justification identification code is generated from the content of specified text data 21 and the log-in directory 40, and compared with the content of justification identification code file 23 corresponding to the specified text data, in which yes if they are equal, or no if otherwise is displayed on the screen of the console 1. This result may be also used as the input into a certain process.

With this example, the management can be simplified by providing a plurality of users having the same log-in directory, because the log-in directory referenced indirectly from the user name is used as the password for the text registration and the text identification.

Eighth Example

In this example, depending on the result of justification identification, the text data is processed if the justification is identified, and excluded from the processing if not.

The system configuration of this example is the same as in FIG. 1. However, the program memory 10 further includes a processing procedure corresponding to the flowchart of FIG. 28.

Next, the processing flow of this example will be described. The process is largely divided into two sections of a text creating/registering process and a process of identifying the justification of the text data for a requested processing and switching the process depending on its result (or executing if it is justified, or not executing if not).

The processing flow for the text creating/registering process is the same as described in connection with the flowchart of FIG. 2 in the first example.

When some processing is taken for such a registered text, the process of switching the requested processing depending on the result of justification identification will be described.

As an example of the requested processing, a process of printing the text registered in the previous process (Zprint) will be described.

Figure 28:
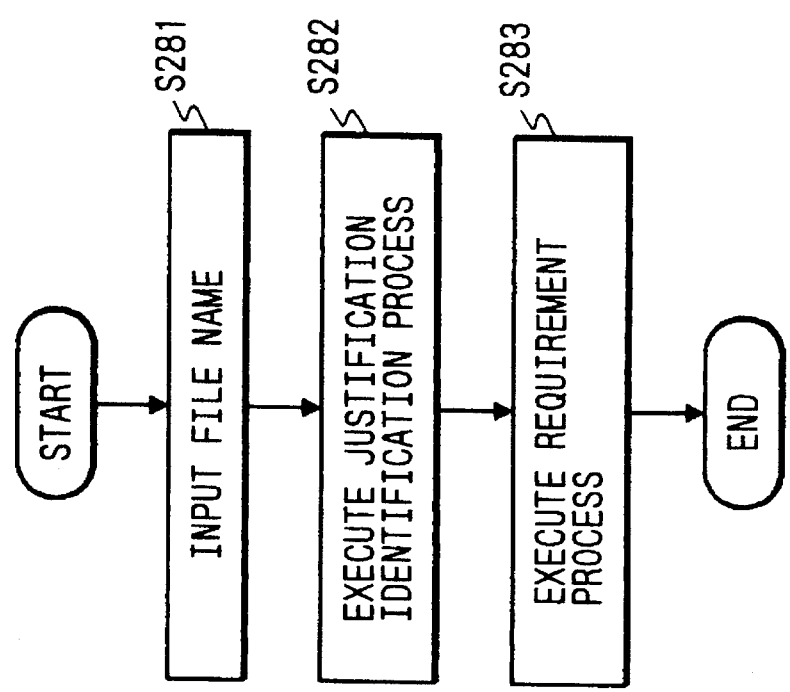
FIG. 28 is a flowchart from the justification identification process to the print process in the eighth example.

This processing will be described with reference to FIG. 28. This process consists of a justification identification processing portion for identifying the justification of the text data and a portion for switching the execution or refusal of the print depending the result of the previous process.

First, at step S281, the file name of interest, as well as the processing command (Zprint), are input from the console 1.

Next, at step S282, the justification identification process for identifying the justification of the text data is executed. The detail of this process is omitted as it is the same as in the first example. As a result of this process, the decision result of valid or invalid is stored in the decision result 33, like the previous example.

At step S283, the processing is performed depending on the content of the decision result 33. That is, the print output of the specified text data is performed if the content of the decision result 33 is "yes", and a message that the print output can not be made as a result of justification identification is displayed on the console 1 (for example, displayed as "print output disabled") if the content of the decision result 33 is "no" (the password or the text content is different from that at the creation).

With the above process, it is possible to confirm whether the text data created and registered has been rewritten after the creation or not, and execute or refuse the requested process depending on the result.

With the method of this example, it is possible to execute or refuse the requested process by confirming whether or not the request is from the authorized user, rather than the justification of the text.

Accordingly, when a plurality of persons jointly participate in the creation of one text by dividing the text into respective portions of the text on the computer, it is possible to avoid the possibility that one's portion in charge is processed (e.g., printed) as a part of the text by other when it is not completed.

While in this example, the justification identification code was appended from the time stamp appended to the text data file and the password input by the user, it will be appreciated that when the code is generated with other method as described in the previous examples, the switching of the processing like this example is also permitted.

In this example, the print processing (Zprint) was adopted as an example of the text processing, and the switching between the execution and the pending (non-execution) was performed. Here, a further processing, for example, issuing an electronic mail for the disabled print to the specific destination, may be provided to output the print if the result is "yes", or the electronic mail is issued if it is "no". That is, a plurality of executable text processings are prepared, and the processing for execution is switched depending on the decision result.

With this example, there is the effect that for a text file, it is possible to confirm whether or not the content of the text has been rewritten, and control the execution of the requested process for the text data depending on its result, so that anyone can freely read or write the text data, but the processing by the unauthorized user or the processing for the rewritten text data can be made invalid, as above described.

Note that in the above examples, the data of interest for deciding the presence or absence for the alteration of the content was the text data, but may be also possible with the program data.

The present invention can be implemented by a system consisting of one or more devices. Further, it will be appreciated that the present invention is also applicable when the feature is accomplished by supplying the program to the system.

What is claimed is:

1. A method for determining whether or not a rewrite of stored data has been made, comprising the steps of:

(A) in storing newly prepared data:
inputting a password;
generating a first code by converting the input password and the newly prepared data in a predetermined procedure; and
storing the newly prepared data and the first code in correspondence thereto; and (B) in reading out the stored data:
inputting the password;
generating a second code by converting the input password and the read out data in said predetermined procedure;
comparing the generated second code and said first code; and
determining that the rewrite of the newly prepared data has been made subsequent to storage in correspondence to the first code if the comparison result is unmatched.

2. The method according to claim 1, wherein said newly prepared data comprises a text.

3. The method according to claim 1, wherein said newly prepared data comprises a program.

4. The method according to claim 1, wherein said data to be stored and said first code corresponding thereto are stored in a same file in such manner as to be distinguished from each other.

5. The method according to claim 1, wherein said first code is stored in a file having a file name generated by adding the file name for the data corresponding to said first code with an expander.

6. A method for determining whether or not a rewrite of stored data has been made, comprising the steps of:

(A) in response to an instruction for storing newly prepared data:
storing the newly prepared data with a present time appended;
inputting a password;
extracting said present time from the stored data;
generating a first code by converting the input password and said extracted present time in a predetermined procedure; and
storing said first code in correspondence to the newly prepared and stored data; and (B) in reading out the stored data:
inputting the password;
extracting said present time from the read out data;
generating a second code by converting the input password and the read out data in said predetermined procedure;
comparing the generated second code and said first code; and
determining that the rewrite of the newly prepared data has been made subsequent to storage in correspondence to the first code if the comparison result is unmatched.

7. The method according to claim 6, wherein said newly prepared data comprises a text.

8. The method according to claim 6, wherein said newly prepared data comprises a program.

9. The method according to claim 6, wherein said first code is stored in a file having a file name generated by adding the file name for the data corresponding to said first code with an expander.

10. A method for determining whether or not a rewrite of stored data has been made, comprising the steps of:

(A) in response to an instruction for storing newly prepared data:
storing the newly prepared data with a first present time appended;
inputting a password;
extracting said first present time from the stored data;
generating a first code by converting the input password and said extracted first present time in a predetermined procedure;

restoring said newly prepared data, accompanied by and distinguished from the generated first code and a second present time; and changing the second present time stored with the restored data to said first present time; and (B) in reading out the stored data:

inputting the password;

extracting said first present time from the read out data;

generating a second code by converting the input password and said extracted first present time in said predetermined procedure;

comparing the generated second code and said first code; and determining that the rewrite of the newly prepared data has been made subsequent to storage in correspondence to the first code if the comparison result is unmatched.

11. The method according to claim 10, wherein said newly prepared data comprises a text.

12. The method according to claim 10, wherein said newly prepared data comprises a program.

13. A method for determining whether or not a rewrite of stored data has been made, comprising the steps of:

(A) in response to an instruction for storing newly prepared data:

storing the newly prepared data with a first present time appended;

inputting a password;

inputting time information;

generating a first code by converting the input password and the input time information in a predetermined procedure;

restoring said newly prepared data, accompanied by and distinguished from the generated first code and a second present time; and changing the second present time stored with the restored data to said time information; and (B) in reading out the stored data:

inputting the password;

extracting said time information from the read out data;

generating a second code by converting the input password and the extracted time information in said predetermined procedure;

comparing the generated second code and said first code; and determining that the rewrite of the newly prepared data has been made subsequent to storage in correspondence to the first code if the comparison result is unmatched.

14. The method according to claim 13, wherein said newly prepared data comprises a text.

15. The method according to claim 13, wherein said newly prepared data comprises a program.

16. A method for determining whether or not a rewrite of stored data has been made, comprising the steps of:

(A) in storing newly prepared data:

determining a user;

generating a first code by converting the information corresponding to the determined user and the newly prepared data in a predetermined procedure; and storing the newly prepared data and the first code in correspondence thereto; and (B) in reading out the stored data:

determining the user;

generating a second code by converting the information corresponding to the determined user and the read out data in said predetermined procedure;

comparing the generated second code and said first code; and determining that the rewrite of the newly prepared data has been made subsequent to storage in correspondence to the first code if the comparison result is unmatched.

17. The method according to claim 16, wherein said newly prepared data comprises a text.

18. The method according to claim 16 wherein said newly prepared data comprises a program.

19. The method according to claim 16, wherein said first code is stored in a file having a file name generated by adding the file name for the data corresponding to said first code with an expander.

20. The method according to claim 16, wherein the information corresponding to said user comprises a user name.

21. The method according to claim 16, wherein the information corresponding to said user comprises a log-in directory correspondent to a plurality of users.

22. A method for determining whether or not a rewrite of stored data has been made and processing the stored data in accordance with a result of such determination, comprising the steps of:

(A) in storing newly prepared data:

inputting a password;

generating a first code by converting the input password and a predetermined portion of the newly prepared data in a predetermined procedure; and storing the newly prepared data and the first code in correspondence thereto;

(B) in processing the stored data:

inputting the password;

generating a second code by reading out the stored data and converting the input password and said predetermined portion of the read out data in said predetermined procedure;

comparing the generated second code and said first code; and processing the read out data if the comparison result is matched, and prohibiting the processing if the comparison result is unmatched.

23. The method according to claim 22, wherein said predetermined portion of the newly prepared data is the newly prepared data itself.

24. The method according to claim 22, wherein said password comprises information corresponding to the user.

25. The method according to claim 22, wherein said newly prepared data comprises a text.

26. The method according to claim 22, wherein said newly prepared data comprises a program.

27. The method according to claim 22, further comprising the step of second processing the read out data when the comparison result is unmatched, wherein the second processing is different from the processing when the comparison result is matched.

* * * * *

UNITED STATES PATENT AND TRADEMARK OFFICE
CERTIFICATE OF CORRECTION

PATENT NO. : 5,481,672
DATED : January 2, 1996
INVENTOR(S) : YASUHIRO OKUNO, et al.

Page 1 of 2

It is certified that error appears in the above-indentified patent and that said Letters Patent is hereby corrected as shown below:

COLUMN 1

Line 13, "face" should read --fact--.
Line 29, "is" should read --are--.
Line 46, "to" should read --to which--.

COLUMN 3

Line 40, "forms" should read --form--.

COLUMN 5

Line 24, "unix" should read --UNIX--.
Line 41, "unix," should read --UNIX,--.

COLUMN 6

Line 14, "with" should be deleted.

COLUMN 13

Line 55, "unix" should read --UNIX--.

UNITED STATES PATENT AND TRADEMARK OFFICE
CERTIFICATE OF CORRECTION

PATENT NO. : 5,481,672

DATED : January 2, 1996

INVENTOR(S) : YASUHIRO OKUNO, et al.

It is certified that error appears in the above-indentified patent and that said Letters Patent is hereby corrected as shown below:

COLUMN 18

Line 14, "claim 16" should read --claim 16,--.

Signed and Sealed this

Fourteenth Day of May, 1996

Attest:

BRUCE LEHMAN

Attesting Officer

Commissioner of Patents and Trademarks